US006381680B1

(12) United States Patent
Nishimukai et al.

(10) Patent No.: US 6,381,680 B1
(45) Date of Patent: *Apr. 30, 2002

(54) DATA PROCESSING SYSTEM WITH AN ENHANCED CACHE MEMORY CONTROL

(75) Inventors: Tadahiko Nishimukai, Sagamihara; Atsushi Hasegawa, Koganei; Masaru Matsumura, Hachioji, all of (JP)

(73) Assignees: Hitachi, Ltd.; Hitachi Micro Computer Engineering, Ltd., both of Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/087,900

(22) Filed: Jun. 1, 1998

Related U.S. Application Data

(63) Continuation of application No. 08/795,639, filed on Feb. 6, 1997, now Pat. No. 5,822,761, which is a continuation of application No. 08/649,333, filed on May 17, 1996, now Pat. No. 5,619,677, which is a continuation of application No. 08/540,218, filed on Oct. 6, 1995, now abandoned, which is a continuation of application No. 08/435,958, filed on May 5, 1995, now Pat. No. 5,509,133, which is a continuation of application No. 07/804,739, filed on Dec. 11, 1991, now Pat. No. 5,479,625, which is a continuation of application No. 07/183,401, filed on Apr. 8, 1988, now Pat. No. 5,148,526, which is a continuation of application No. 06/694,126, filed on Jan. 23, 1985, now abandoned.

(30) Foreign Application Priority Data

Jan. 23, 1984 (JP) ............................................... 59-8572
Jun. 1, 1984 (JP) ........................................... 59-110764

(51) Int. Cl.[7] .......................... G06F 12/00; G06F 13/00
(52) U.S. Cl. ......................... 711/138; 711/3; 711/100; 711/138; 711/167
(58) Field of Search ................................. 711/167, 138, 711/2, 3, 100, 154

(56) References Cited

U.S. PATENT DOCUMENTS 3,845,474 A    10/1974  Lange et al. ................ 364/200
4,055,851 A  * 10/1977  Jenkins et al. .............. 711/167
4,075,686 A  *  2/1978  Calle et al. .................. 711/138
4,136,386 A     1/1979  Annunziata et al. ........ 364/200
4,161,024 A     7/1979  Joyce .......................... 364/200
4,167,782 A     9/1979  Joyce et al. ................. 364/200
4,197,580 A     4/1980  Chang et al. ............... 364/200
4,219,883 A     8/1980  Kobayashi et al. ......... 365/189
4,264,953 A  *  4/1981  Douglas et al. ................ 711/3
4,322,795 A     3/1982  Lange et al. ................ 364/200
4,323,967 A     4/1982  Peters et al. ................ 364/200
4,371,928 A     2/1983  Barlow et al. .............. 364/200
4,399,506 A     8/1983  Evans et al. ................ 364/200
4,445,170 A  *  4/1984  Hughes et al. ................ 711/2
4,445,174 A     4/1984  Fletcher ..................... 364/200
4,467,921 A     8/1984  White ......................... 395/425
4,654,819 A     3/1987  Stiffler et al. .............. 364/200

FOREIGN PATENT DOCUMENTS

JP          58-48289         3/1983

* cited by examiner

*Primary Examiner*—Tuan V. Thai
(74) *Attorney, Agent, or Firm*—Antonelli, Terry, Stout & Kraus, LLP

(57) ABSTRACT

A detect circuit is provided in a system such as an I/O mapped microcomputer system in order to detect whether or not an access address for a read access request generated by a central processing unit (CPU) is for a part (such as a status register in the above-mentioned microcomputer system) accessible by another processing device, such as an I/O device, within the entire storage area (such as a main storage and the status register) accessible by the central processing system. If data to be fetched for an instruction executed by the central processing unit is not found in a cache memory, the data is fetched from the entire storage area. A write circuit is provided which writes the fetched data into the cache memory when the detect circuit shows that the access address is not for the part accessible by the other processing device within the entire storage area, but otherwise the write circuit does not write the fetched data into the cache memory.

18 Claims, 10 Drawing Sheets

DATA PROCESSING SYSTEM WITH AN ENHANCED CACHE MEMORY CONTROL

This is a continuation of application Ser. No. 08/795,639, filed Feb. 6, 1997; now U.S. Pat. No. 5,822,761 which is a continuation of application Ser. No. 08/649,333, filed May 17, 1996 now U.S. Pat. No. 5,619,677; which is a continuation of application Ser. No. 08/540,218, filed Oct. 6, 1995, now abandoned; which is a continuation of application Ser. No. 08/435,958, filed May 5, 1995, now U.S. Pat. No. 5,509,133; which is a continuation of application Ser. No. 07/804,739, filed Dec. 11, 1991, now U.S. Pat. No. 5,479,625; which is a continuation of application Ser. No. 07/183,401, filed Apr. 8, 1988 now U.S. Pat. No. 5,148,526; which is a continuation of application Ser. No. 06/694,126, filed Jan. 23, 1985 now abandoned.

BACKGROUND OF THE INVENTION

The present invention relates to a data processing system having a buffer memory, and particularly to a system which is suited for a microprocessor which supports a memory mapped I/O system, a multi-processor having a common memory, and the like.

In microcomputers, a memory mapped I/O system has heretofore been widely used to control the input/output device by accessing an input/output control register in the same address space as the main memory using general instructions, without providing special instructions to control the input/output device.

FIG. 1 is a block diagram showing a memory mapped I/O system, wherein a processor 1 controls a main memory 2 and input/output control circuits 3, 5 for respective I/O devices 4, 6 via a system bus 100. Inherent addresses are assigned to the main memory 2, and to the input/output control circuits 3, 5 respectively. Values stored in control registers (not shown) in the input/output control circuits 3, 5 are rewritten by the processor 1, and input/output devices 4, 6 are controlled by the new value in the control registers. Further, when their own statuses are changed, the input/output devices 4, 6 rewrite the values stored in the status registers (not shown) in the input/output control circuits 3, 5. When the contents of the main memory 2 are to be rewritten in response to a store instruction, the processor 1 applies to the system bus 100 a write address assigned to the main memory 2, data to be written and a write command. When the contents of the main memory are to be read out in response to a load instruction, a read address assigned to the main memory 2 and a read command are applied to the system bus 100, and the data sent from the main memory 2 to the system bus 100 is received by the processor 1 as read data. The input/output device 4 starts to operate when a start bit in a control register (not shown) in the input/output control circuit 3 is turned on.

For instance, when the store instruction is to be executed for the control register and an inherent address for the control register is used as the write address of the store instruction, the input/output device 4 starts to operate. On the other hand, to detect the completion of operation of the input/output device 4, the status register (not shown) in the input/output control circuit 3 is read out by the above-mentioned load instruction, and the operation completion bit of the status register is checked to see whether it is on or off. When the operation completion bit is on, other bits of the status register are checked to detect the condition of completion, such as normal completion or abnormal completion.

Using the memory mapped I/O system, as mentioned above, the input/output device can be controlled in a sophisticated manner using general instructions, without the need of providing special input/output instructions, The microprocessor is often provided with a cache (buffer memory) to improve performance. However, a problem arises, as described below with reference to FIG. 2, if use is made of a system in which a cache is incorporated into the aforementioned memory mapped I/O system. FIG. 2 is a block diagram of a system using a cache (buffer memory) in a memory mapped I/O system.

In FIG. 2, the processor 1 consists of a central processing unit (CPU) 10 for executing instructions, and a cache 11 which stores addresses for referring to the main memory 2 as well as data stored in the regions of the main memory indicated by the addresses. If now it is requested by the CPU 10 to refer to the data in regions of the main memory 2 to effect instruction fetching or data reading, the cache 11 is first checked. When the desired data is found in the cache 11, the data of the cache 11 is sent to the CPU 10 thereby to complete the reading of the data or instruction. However, when the data is not found in the cache 11, the corresponding data is read from the main memory 2 via the system bus 100. The data which is read out is sent to the CPU 10, and at the same time is stored in the cache 11 along with the read addresses thereof. When data is to be written into the main memory 2 from the CPU 10, the write data and the write addresses produced from the CPU 10 are sent to the main memory 2 via the system bus 100, and the corresponding write data is written into the main memory 2. At the same time, the write data and the write addresses are also stored in the cache 11.

The cache 11 has an access speed which is faster than that of the main memory 2. Therefore, since the data in the main memory 2 that is once read out or written also has been stored in the cache 11, the access time for such data can be reduced when reference is made again to the same data by obtaining the data from the cache 11.

However, we recently noticed that a problem will arise as described below when reference is made to the status register (not shown) in the input/output control circuit 3 or 5 in a system of the memory mapped I/O type when a cache is added to the processor.

It is assumed that the processor 1 executes a program which checks the status register (not shown), and waits for the completion of operation of the input/output device 4. As the CPU 10 makes reference to the status register in the input/output control circuit 3, the value stored in the status register is sent to the CPU 10 and is also stored in the cache 11. The CPU 10 checks the completion bit of the status register. When the completion bit is on, the operation should proceed to the next program instructions. When the completion bit is off, the status register should be read repetitively and the completion bit checked repetitively. When an instruction to read the status register is executed for the second and subsequent times, however, the value stored in the cache 11 is sent back to CPU 10 as the data of the status register. Therefore, even when the input/output operation of the input/output device 4 is completed, and the completion bit of the status register in the input/output control circuit 3 is turned on, the processor 1 is not capable of detecting this fact, because it is looking at old data stored in the cache 11. We further noticed that there also arises a problem that when it is attempted to read out the contents of the status register, the value of the control register is read out instead, in the case when the control register and the status register are allocated to different bits of the same register with the same address, or in the case when the control register and the status register are allocated to the same address, the control register is accessed at the time of writing the data, and the status register is accessed at the time of reading the data. This is because the value written into the control register has been stored in the cache 11 and, when an instruction to read the status register is executed, the data stored in the cache 11 for the control register is read out.

Described below is a problem which we noticed is apt to develop in transferring a message between the buffer memory and the processors in a multiprocessor system in which a plurality of processors are coupled to disperse the load.

A system which performs the processing by transferring messages between two processors is described below with reference to the block diagrams of FIGS. 3 and 4. FIG. 3 is a block diagram of a system which consists of processors 1 and 7, local memories 2 and 2' provided exclusively for these processors, and a main memory 8 for communicating the message between processors via the buses 100 and 101. Usually, each of the processors 1 and 7 performs processing using its own local memory 2 or 2'. When the processor 1 requests the processor 7 to perform processing, however, the processor 1 writes the processing to be done and data necessary for the processing into predetermined regions of the main memory 8, and then interrupts the processor 7. When interrupted, the processor 7 reads the contents of the memory 8, and performs the processing that is requested. When the processing is finished, the processor 7 writes the results into the memory 8 to inform the processor 1, and interrupts the processor 1. Then, the processor 7 resumes the previous processing. Being interrupted by the processor 7, the processor 1 takes out the processed results from the memory 8, and continues processing. When the processing requested to the processor 7 is being executed, the processor 1 carries out other processing using the local memory 2.

FIG. 4 is a block diagram of a system in which the two processors 1 and 7 are connected to a common system bus 100 to commonly use the main memory 2. These processors access the main memory 2 independently from each other. However, when one processor is accessing the main memory 2, the other processor is so controlled that its request for access remains on standby. According to this system, messages between the processors are communicated using a particular region of the main memory 2. Namely, this system is the same as the system shown in FIG. 3, except that the region for writing the message is a particular region in the main memory 2.

In these two systems, if the processors 1 and 7 are provided with general buffer memories, 11 and 71, a problem arises as described below. That is, when, for example, the processor 1 writes the data in a region for communicating the message, the value of the cache 11 possessed by the processor 1 is renewed as the data is written. However, the value of the same address is not renewed even when it has been stored in the buffer memory 71 of the processor 7. Accordingly, even when the processor 7 accessses the message region, the data of the buffer memory 71 is read out, and the message of the processor 1 is not correctly received.

SUMMARY OF THE INVENTION

The present invention was accomplished to solve the above-mentioned problems, and its object is to provide a data processing system such as a system having microprocessors in a memory mapped I/O system, multiprocessor system, or the like systems, which is capable of accessing the data without inconsistency even when cache memories are provided to improve performance. In order to attain this purpose, a detect circuit is provided in a system such as an I/O mapped microcomputer system in order to detect whether or not an access address for a read accesses request generated by a central processing unit (CPU) corresponds to an area (such as a status register in the above-mentioned microcomputer system) which is accesible by another processing device, such as an I/O device, within the entire storage area (such as a main storage and the status register) which is accessible by the central processing system. If data to be fetched from an instruction executed by the central processing unit is not found in a cache memory, the data is fetched from the entire storage area. A write circuit is provided which writes the fetched data into the cache memory when the detect circuit shows that the access address does not corresponds to the area accesible by the other processing device within the entire storage area, but otherwise the write circuit does not write the fetched data into the cache memory.

DETAILED DESCRIPTION OF THE PREFERRED EMBODIMENT

Figure 1:
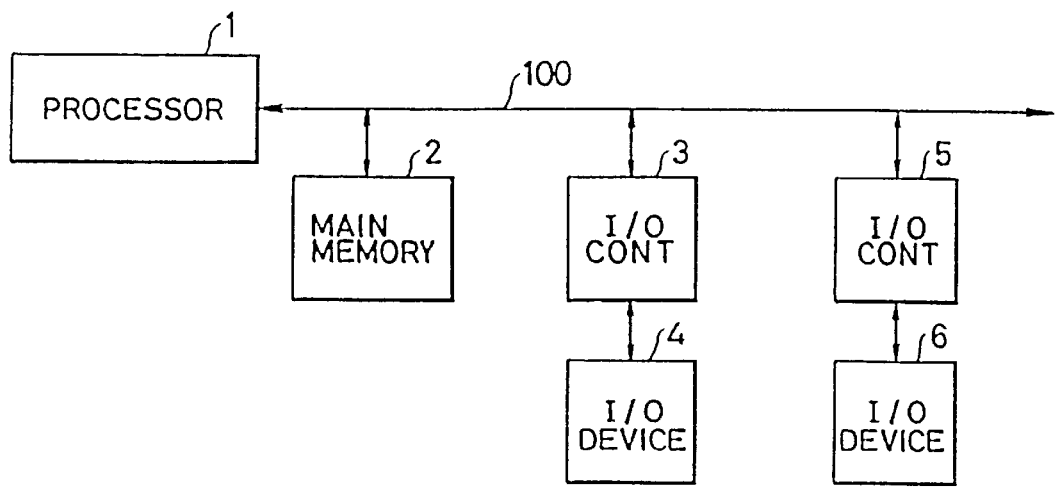
FIG. 1 is a block diagram of a prior art system based upon the memory mapped I/O system.
Figure 2:
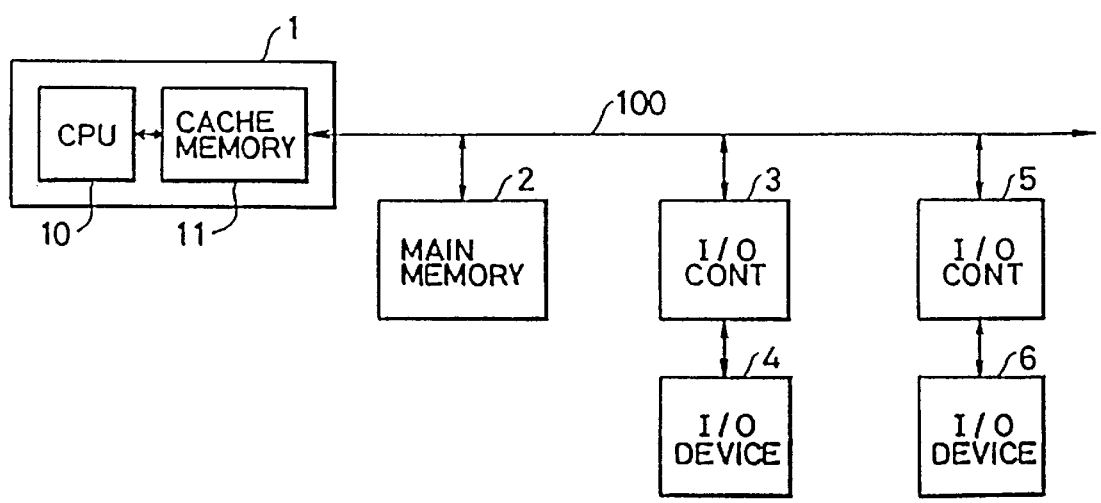
FIG. 2 is a block diagram which illustrates a problem which arises in memory mapped I/O system; in which cache memory is employed
Figure 3:
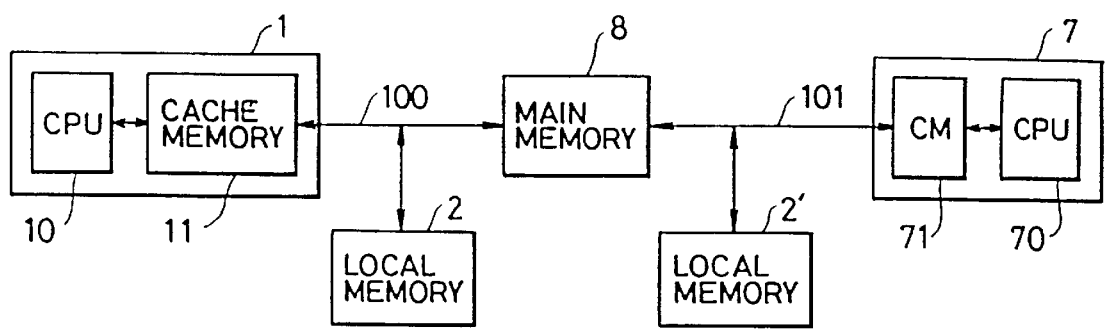
FIG. 3 is a block diagram of a prior art system based upon the multiprocessor system having a common memory.
Figure 4:
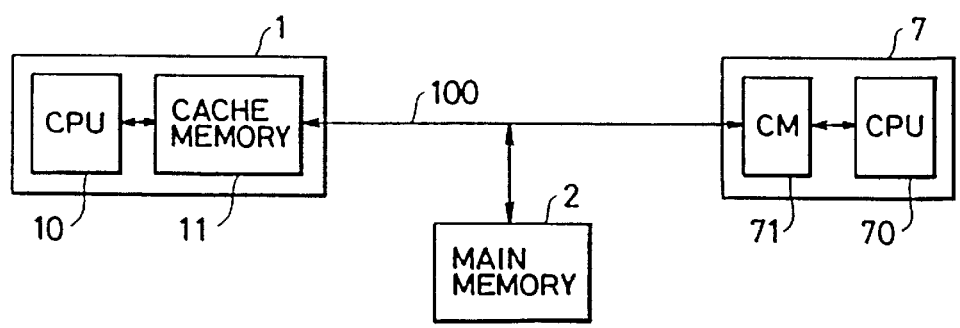
FIG. 4 is a block diagram of another prior art system based upon the multiprocessor system having a common memory.
Figure 5:
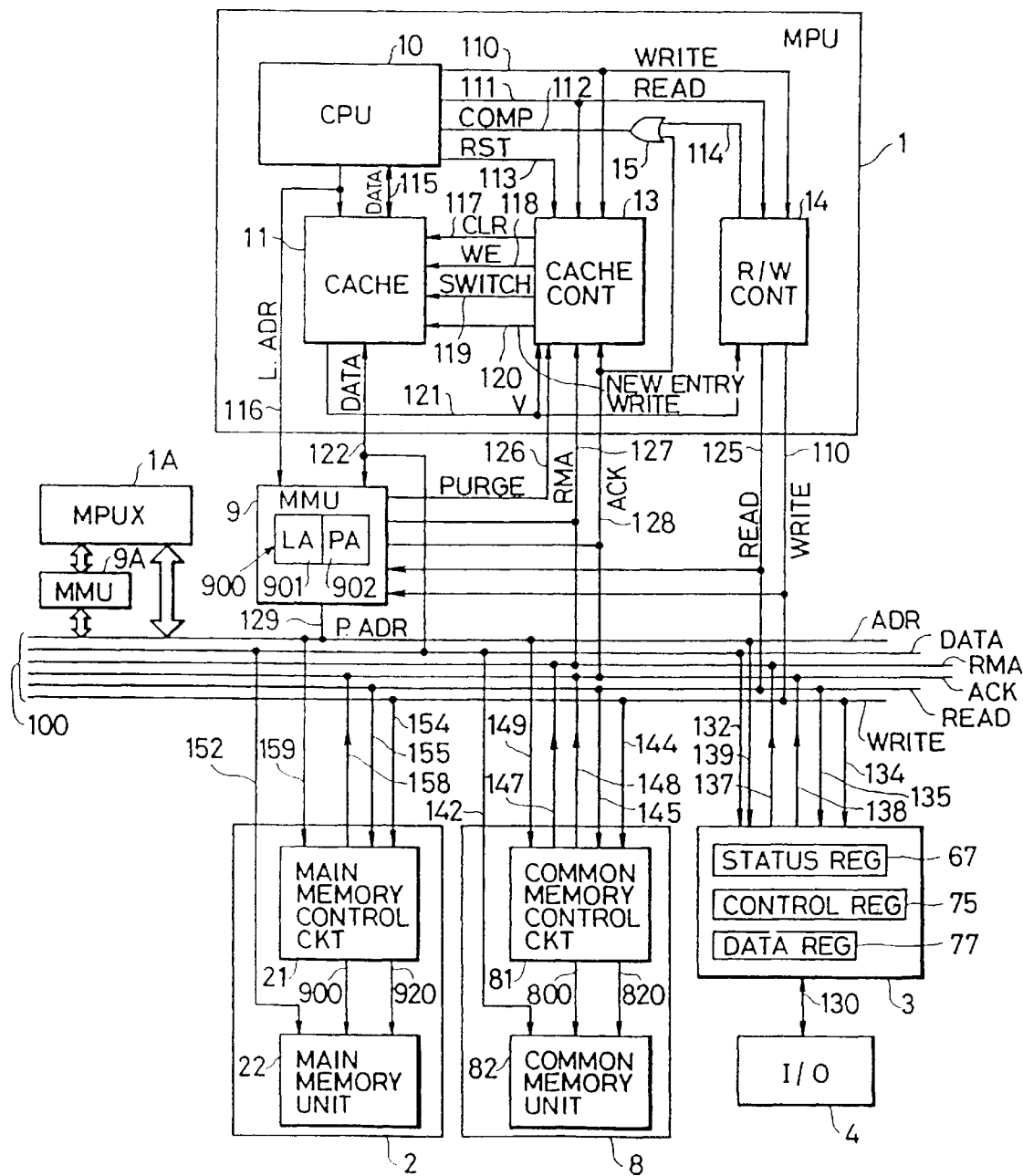
FIG. 5 is a diagram showing a system according to an embodiment of the present invention.

An embodiment of the present invention will be described below in detail in conjunction with FIGS. 5 to 13. FIG. 5 is a diagram showing the structure of the whole system according to an embodiment of the present invention, and FIGS. 6 to 12 are circuit diagrams of the blocks of FIG. 5.

In FIG. 5, the system according to the present invention consists of a microprocessor 1 (hereinafter abbreviated as MPU), a memory management unit 9 (hereinafter abbreviated as MMU), a main memory 2, a common memory 8, an input/output control circuit 3, an input/output device 4, a system bus 100, another microprocessor 1A (hereinafter abbreviated as MPUX) that is connected to the system bus and a related memory management unit 9A.

The MPU 1 consists of a central processing unit (CPU) 10 which executes instructions, a cache memory 11, a cache memory control circuit 13, a read/write control circuit 14, and an OR gate 15. The MPU 1 is connected to the MMU 9 through an address signal line 116, a data signal line 122, a read signal line 125, a write signal line 110, a PURGE signal line 126, an ACK signal line 128, and an RMA signal line 127, and is further connected to the system bus 100 through the data signal line 122, the read signal line 125, the write signal line 110, the ACK signal line 128 and the RMA signal line 127. Here, the ACK signal indicates the completion of an operation, and the RMA signal indicates whether the data can be written into the cache 11 or not.

The MMU, which is an address translator for supporting a virtual storage system, converts a logical address provided by CPU 10 on line 116 into a physical address based upon an address translation table 90 which contains logical and physical address tables 901 and 902 and sends the physical address to the system bus 100 via an address signal line 129.

The main memory 2 consists of a main memory control circuit 21 and a main memory unit 22, and is connected to the system bus 100 through a data signal line 152, an address signal line 159, a read signal line 155, a write signal line 154 and an ACK signal line 158. It is to be noted that an RMA signal line is not connected to the main memory 2. The main memory 2 stores instructions and data that are to be processed by the MPU1.

The common memory 8 consists of a common memory control circuit 81 and a common memory unit 82, and is connected to the system bus 100 through a data signal line 142, an address signal line 149, a read signal line 145, a write signal line 144, an ACK signal line 148 and an RMA signal line 147. The common memory 8 stores data for communicating between the MPU 1 and the MPUX 1A, as well as instructions and data to be processed by the MPUX 1A.

The input/output control circuit 3 is connected to the system bus 100 through a data signal line 132, an address signal line 139, a read signal line 135, a write signal line 134, an ACK signal line 138, and an RMA signal line 137, and controls the input/output device 4 via a signal line 130 to transfer the input/output data provided from or to said input/output device 4.

In the system bus 100, all lines for the same signals such as the ACK signal lines 138, 148, 158 and the RMA signal line 137, 147 from various devices are provided with a wired OR connection, respectively. The ACK signal line 128 or the RMA signal line 127 connected to the MPU 1 is enabled when the ACK signal or RMA signal are turned on by either one of the MMU 9, the main memory 2, the common memory 8 or the input/output control circuit 3. Conversely, the ACK signal line 128 or the RMA signal line 127 is turned off when all of the ACK signals or RMA signals from the above-mentioned devices are turned off.

Figure 13:
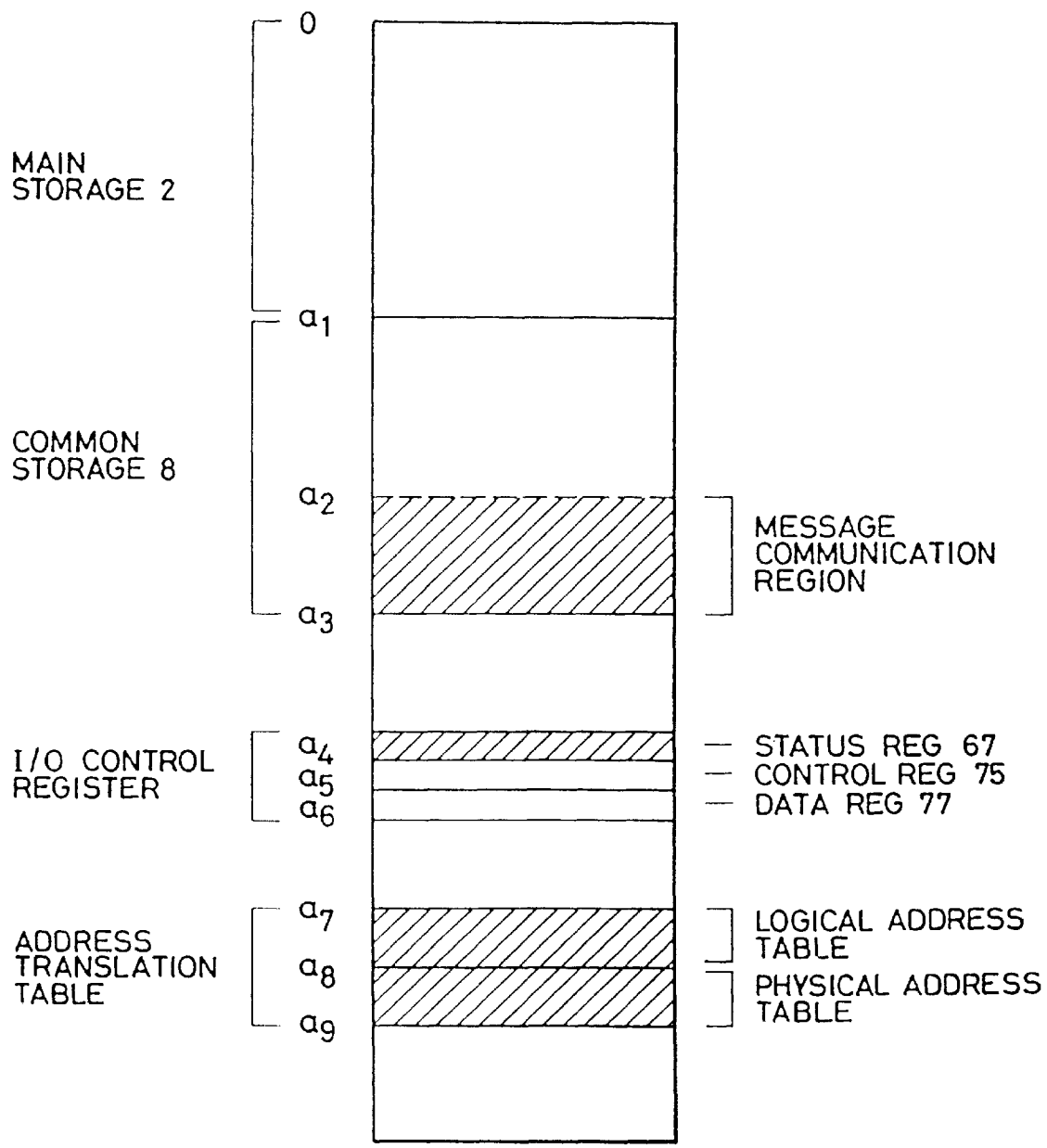
FIG. 13 is an address map used in the system of FIG. 5.

FIG. 13 shows an address map of the system of FIG. 5. The main memory 2 is assigned addresses from zero to $a_1$-1, and the common memory 8 is assigned addresses $a_1$ to $a_1$-1. The area of the addresses from $a_2$ to $a_1$-1 with the common memory 8 is an area for communicating messages between the MPU 1 and the MPUX 1A. The status register 67, the control register 75, and the data register 77 are respectively assigned the addresses $a_4$, $a_5$ and $a_6$. The logical address table 901 and the physical address table 902 of the address translation table 90 within the MMU 9 are respectively assigned addresses $a_7$ to $a_8$-1 and $a_8$ to $a_9$-1.

The general idea of the memory mapped I/O system will be explained briefly hereinafter, in case, of an input/output device 4 comprised of a card reader.

When card data is read, the input/output control circuit 3 writes data identifying an interrupt factor and interrupts the MPU 1. The line for providing the interrupt signal to MPU 1 is not shown in FIG. 5 for simplicity. MPU 1 starts a program to read the status register 67 and to analyze the interruption factor. When MPU 1 knows that the interrupt is due to reading of card data, it performs a program which reads the card data by way of the data register 77 and stores the data into the main memory 2. After all of the card data is written into the main memory 2, the MPU1 executes an instruction which writes a read OK bit into the control register 75 to allow reading of the next card by the card reader. Thereafter, the operation given above is repeated. It is to be noted that read-out of the status register 67 and writing into the control register 75 is performed in a quite similar way to the reading or writing in connection with the main memory 2, except for the difference in the associated addresses.

Now explanation of the system in FIG. 5 is given. When the power supply is turned on and the circuit in FIG. 5 is reset, CPU 10 turns a reset signal line 113 on and instructs the cache control circuit 13 to clear the cache 11. The cache control circuit 13 turns the clear signal line 117 on to invalidate all of the contents stored in the cache 11.

To read the data, the address for the data is produced by CPU 10 on the address signal line 116, and the read request signal line 111 is turned on. The data is read out onto the data line 115 from either one of the cache 11, the main memory 2, the common memory 8, or the control circuit 3. As will be explained in more detail below, the signal line 112 is turned on upon completion of reading or writing of the data. In response to this signal 112, CPU 10 receives the data on the signal line 115 as the read data, and discontinues the address signal on the line 116. Therefore, the read request signal line 111 is turned off, and the reading operation is completed.

Figure 6:
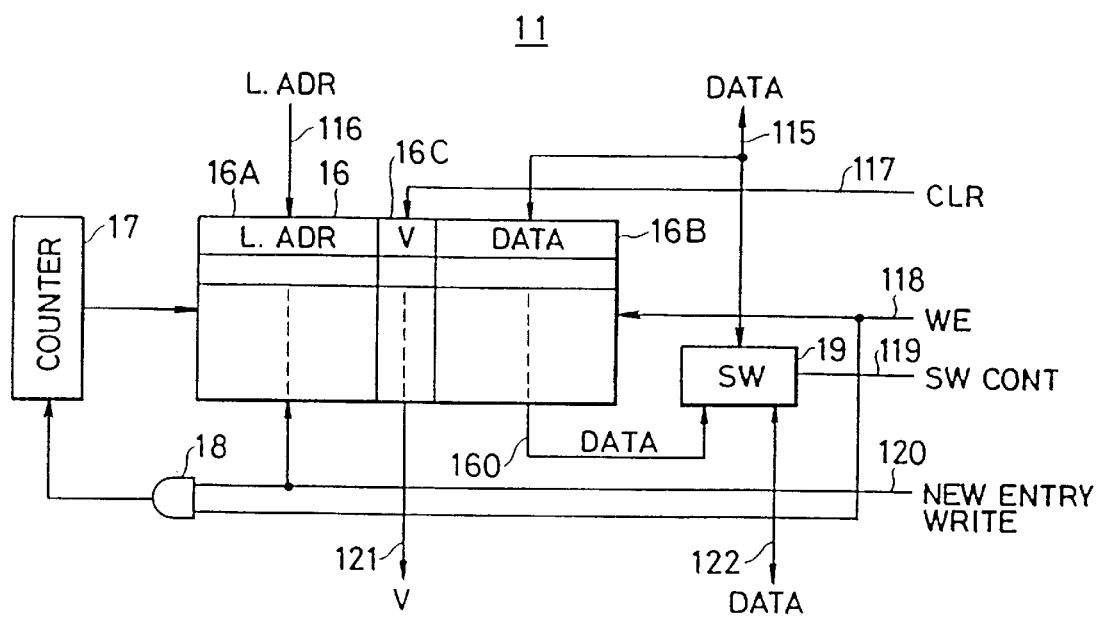
FIG. 6 is a circuit diagram of a cache memory shown in FIG. 5.

The cache 11 checks to see whether data for the read address produced on the address signal line 116 is held by the cache 11 or not, and turns the valid signal line 121 on when valid data is held and reads out the data from an associative memory 16 (FIG. 6) inside the cache 11 onto an internal line 160 (FIG. 6). In parallel with this, the cache control circuit 13 turns a switch control signal line 119 on when the read request signal line 111 and the valid signal line 121 are on, and controls switch 19 (FIG. 6) inside the cache 11 so that the read out data is transferred from the the internal associative memory 16 to the data signal line 115 by way of the internal switch 19 (FIG. 6). Meanwhile, when the read request signal line 111 is on and the valid signal line 121 is on, the read/write control circuit 14 renders the decision that the data is to be read from the cache 11, and turns the completion signal line 114 on thereby to turn on the completion signal line 112 by way of the OR gate 15, and informs the CPU 10 that the data read operation has been completed. Upon receipt of this completion signal 112, CPU 10 receives the data on the line 115, and finishes the reading operation.

On the other hand, the valid signal 121 stays turned off when the corresponding data is not held by the cache 11. When the read request signal line 111 is on and the valid bit signal line 121 is off, the read/write control circuit 14 turns the read request signal line 125 on and provides the read request to the system bus 100, to read the data from outside MPU1. The logical address produced from the MPU 1 is converted by the MMU 9 into a physical address and the physical address is sent to the system bus 100 by way of the line 129. Responsive to the address signal and the read request signal, respectively, on the lines 159 and 155 connected to the system bus 100, the main memory control circuit 21 detects whether or not the address on the address line 159 connected to the system bus 100 is for the main memory 2, and when the detection result is affirmative, that is, when the address is within 0 to $a_1$-1, the main memory control circuit 21 reads the corresponding data from the main memory unit 22 by sending the address and control signals by way of lines 900 and 920, and provides control so that the data is produced onto the data signal line 152, thereby to provide the data onto the line 122 by way of the bus 100. When the reading of data is completed, the main memory control circuit 21 turns the ACK signal line 158 on, thereby to turn on the ACK signal line 128 by way of the bus 100. Since the main memory control circuit 21 is constructed so as not to provide the RMA signal, the RMA signal line 127 remains off. The ACK signal line 128 is connected to the CPU 10 via OR gate 15 to provide to it the completion signal 112. At this moment, the cache control circuit 13 turns the switch signal line 119 off in response to the valid bit signal 121, and instructs the internal switch 19 (FIG. 6) of the cache 11 that the data signal line 122 and the data signal line 115 are to be connected together, whereby the data which is read from the main memory unit 22 is transferred to the CPU 10. Under the condition that the ACK signal line 128 is turned on and the RMA signal line 127 is turned off, the cache control circuit 13 turns the write enable signal line 118 on and in response to the absence of the valid bit signal on line 118, the cache control circuit 13 turns on the signal line 120, and so indicates that the data which is read be stored in a new entry of the cache 11. Responsive to these two signals, the cache 11 erases one of the data that has been stored already, and stores the data that is read on the line 115 and an address thereof provided on the line 116 by CPU 10. Therefore, if it is requested to read the data based upon the same address later on, the data stored just now in the cache 11 is read out, instead of the data stored in the main memory 2. The input/output control circuit 3 also receives the read request signal on the line 125 and the address on the line 129, respectively, by way of lines 135 and 139, both connected to the system bus 100. The input/output control 3 detects whether or not the control register 75, the data register 77 or the status register 67 in the input/output control circuit 3 is to be read out, based upon the address signal 139 and the read request signal 135, and when the detection result is affirmative, that is, when the address is either one of $a_4$, $a_5$ or $a_6$, the data in the control register 75 or the status register 67 is sent to the data signal line 132, thereby to send the read out data to the data signal line 122 by way of the bus 100. At the same time, the input/output control circuit 3 turns the ACK signal line 138 and the RMA signal line 137 on, thereby it turns on the ACK signal line 128 and the RMA signal line 127, respectively, which are connected to the lines 138 and 137 by way of the system bus 100. Even if the read request signal line 111 is on and the ACK signal line 128 is on, the cache control circuit 13 does not turn the write enable signal 118 on if the RMA signal line 127 is on, and the data on the line 122 is not written into the cache 11. Since the valid signal 121 is off, the cache control circuit 13 keeps the switch control signal 119 turned off.

Therefore, the internal switch 19 (FIG. 6) of the cache 11 connects the data signal lines 122 and 115, thereby to allow the data read out of the control register 75 or the status register 67 to be transferrd to the CPU 10. As with the case of read-out from the main memory 2, the ACK signal 128 is transferred to the OR gate 15, thereby to provide the CPU 10 with the completion signal 112.

A similar operation to that of the input/output control circuit 3 is performed by the common storage control circuit 81, which receives the address signal 129 and the read request signal 125, respectively, by way of the bus 100 and the line 149 and by way of the bus 100 and the line 145. The common memory 8 is divided into two regions, i.e., a region of addresses from $a_2$ to $a_3$-1 for communicating messages between the MPU 1 and the MPUX 1A and a region of addresses to $a_1$, to $a_2$-1 for storing instructions and data that are to be processed by the MPUX 1A. The MPU 1 accesses only the region for communicating messages. When the common storage control 81 detects, based upon the address signal on the line 149 and the read request signal on the line 145, that the data is to be read from the region for communicating messages within the common memory 82, the common memory control circuit 81 performs the read operation to send the read out data onto the line 132, and turns the RMA signal line 147 and the ACK signal line 148 on. Like the aforementioned control register and the status register in the input/output control circuit 3, the data in the region for communicating messages is sent to CPU 10 but not stored in the cache 11 of MPU 1. If the MPUX 1A has been constructed in the same manner as the MPU 1, the data of the region for communicating messages can be accessed by MPUX 1A by way of the bus 100 in a similar way, and the accessed data is also not stored in the cache (not shown) of MPUX 1A. On the other hand, when the data in a region that stores instructions and data for the MPUX 1A is accessed by MPUX 1A, the common memory control circuit 81 turns the RMA signal 147 off. Therefore, the MPUX 1A writes the accessed data of that region into the cache (not shown) thereof, to execute the processing in the same manner as the main memory of MPU 1.

This control operation is realized by providing the common memory control circuit 81 with a circuit which judges whether the address on the line 149 belongs to the region of the MPU 1 or to the region of the MPUX.

In the multiprocessor system, therefore, the message can be communicated without developing an inconsistency between the cache 11 and the common memory 82.

The above description has dealt with a multi-processor system employing two processors. It will, however, be easily understood that the same effects are obtained even when three or more processors are employed.

Next, the access to the address translation table 90 in the MMU 9 will be explained. The read request signal 125 or the write request signal 110 is also provided to the MMU 9, as well as the logical address 116 and the data 122. The MMU 9 responds to the read or write request signals 125, 110 when the logical address 116 is within the address region assigned to the logical address table 901 or the region assigned to the physical address table 902, that is, in case of FIG. 13, the region of addresses from $a_7$ to $a_8$-1 or from $a_8$ to $a_9$-1. In this case, no address translation is performed by the MMU 9. In the case when the read request signal 125 is provided to the MMU 9, the data in either one of the two tables 901, 902 is read out onto the line 122, and the MMU 9 provides the ACK signal and the RMA signal, respectively, onto the lines 128 and 127. The ACK signal is transferred to the OR gate 15, to provide the completion signal 112 to the CPU 10. The cache control circuit 13 does not write the data on the line 122, because the signal RMA is provided to the control circuit 13, as was explained, for example, in connection with reading of data from the input/output control circuit 3.

The cache 11 is controlled so as not to write any data within the table 90, as will be clear from the explanation below. Therefore, the valid bit signal 121 remains turned off even if the address 116 is applied to the cache 11. Therefore, the switch 19 (FIG. 6) inside the cache 11 connects the line 115 to the line 122, thereby to enable the CPU 10 to receive the data read out of the address table 90.

There will now be given an explanation of the operation which occurs when CPU 10 executes an instruction which requires writing of data into the main memory 2, the common memory 8, or the input/output control circuit 3. To write the data, the CPU 10 produces an address for writing the data on the address signal line 116, produces the write data on the data signal line 115, and turns the write request signal line 110 on. The data is written into the cache 11 and one of the main memory 2, the common memory 8 or the input/output control circuit 3. Upon completion of writing, the completion signal line 112 is turned on, as was done with the case of reading of data, the CPU 10 discontinues use of the address signal line 116 or the data signal line 115, and further turns the write request signal line 110 off.

The operation for writing data will now be described in more detail. When the read signal 111 is not turned on, the cache control circuit 13 keeps the switch control signal 119 turned off, and so instructs the cache 11 that the data signal lines 115 and 122 are to be connected. Due to this instruction, the write data is transferred from CPU 10 to the system bus 100 by way of the lines 115 and 122 and to MMU 9. When the write request signal 110 is turned on, the read/write control circuit 14 sends the write request signal 110 to MMU 9 and to the system bus 100. Further, the address on the address signal line 116 is converted by the MMU 9, and is sent to the system bus 100. The main memory 2 is connected to the system bus 100 by way of the write request signal line 154. Responsive to the address signal 159 and the write request signal 154, the main memory control circuit 21 performs the same operation as the case of reading data except that it controls the main memory unit 22 in such a way that the data signal 152 is written into the corresponding address location of the main memory unit 22. That is, it turns the ACK signal 158 on when the write operation of data is completed. Therefore, the ACK signal 128 is turned on, and the completion signal 112 is provided to CPU 10 via the OR gate 15. The RMA signal 127 remains turned off.

Even at the time of writing the data, the cache 11 checks to see whether or not the data of the logical address on the line 116 has been stored, and if the check result is affirmative, a valid bit signal is produced on the valid bit signal line 121. As the ACK signal 128 is turned on, the RMA signal line 127 is off, and the write request signal 110 is on, the cache control circuit 13 turns the write enable signal 118 on irrespective of the presence of the valid bit signal on the line 121. When the valid bit signal 121 is turned on, the cache control circuit 13 turns the signal 120 off, and operates to replace the data within the cache 11, at a location designated by the address on the line 116, by the data on the line 115. When the signal 121 remains turned off, however, the cache control circuit 13 turns the new entry write signal 120 on, and operates to erase one of the data that have been stored already, and to store the write address on the line 116 and the data on the line 115 at a location where the erased data was stored.

When the data provided by CPU 10 is to be written into the control register 75, the data register 77 or the status register 67 in the input/output control circuit 3, the input/output control circuit 3 detects the presence of the request from the address signal 139 and the write signal 134 which is transferred from the line 125 by way of the bus 100. Then, the input/output control circuit 3 writes the data signal 132 into a designated register, and turns the ACK signal 138 and the RMA signal 137 on. Even when signal 110 becomes on and the ACK signal 128 is on, the cache control circuit 13 does not turn the write enable signal 118 on when the RMA signal 127 is on. Therefore, the address and data of the control register 75, the data register 77 or status register 67 in the input/output control circuit 3 are not written into the cache 11.

In reading the data from or writing the data into the control register 75, the data register 77 or status register 67 in the input/output control circuit 3, the cache 11 checks to see whether the data has been stored therein. However, since no data of the three registers has been stored, the valid bit signal 121 is always turned off. When the data is to be read out, therefore, the data is read from the three registers and not from the cache 11.

Accordingly, even when the cache is provided, the input and output of data can be controlled without developing an inconsistency in the memory mapped I/O system.

When the data provided by the CPU is to be written into the region of the common memory unit 22 for communicating messages between the MPU 1 and the MPUX 1A, the common memory control circuit 81 responds to the address on the line 149 and the write request on the line 144, which is connected to the write request signal line 110 by way of the bus 100, and performs a similar operation to that for reading data from the common memory unit 8, except that the common memory control circuit 81 controls the common memory unit 82 so that the latter stores the data on the line 142. The operation of the cache 11 is the same as the case of writing of data into the input/output control circuit 3.

Next will be explained the write operation to the MMU 9. In the case where the write request signal 110 is provided to the MMU 9, the data is written in either one of the two tables 901, 902, when the address on the line 116 falls within a region of $a_7$ to $a_0$-1. Even in this case, the ACK signal and the RMA signal are generated as in the case of reading of the address translation table 90, so no writing is done to the cache 11. MMU 9 further generates a purge signal onto the line 126. Upon receipt of the purge signal 126, the cache control circuit 13 turns the clear signal 117 on, and invalidates all of the cache memories 11.

Due to this invalidation, the relationship between the data at logical addresses in the cache 11 and the data at physical addresses in the memory is maintained. For instance, if it is presumed that the data at a logic address 100 is stored in the cache 11, and if this data which is read out and which corresponds to data at the physical address 1000 due to address conversion is caused to correspond to address 500 by rewriting the address conversion table, the data of physical address 1000 in the cache 11 is read out when the processor reads the data of address 100, resulting in the occurrence of an inconsistency. When the address conversion table is rewritten, the purge signal is produced to invalidate the cache 11, to prevent this problem.

Internal circuits of major blocks of FIG. 5 will be described below in conjunction with FIGS. 6 to 10.

FIG. 6 is a circuit diagram of the cache 11 which consists of an associative memory 16, a counter 17, an AND gate 18, and a switch 19. The associative memory 16 has plural entries each storing an address, data and a valid bit. When the clear signal 117 is turned on at an initial stage of the operation of the system, effective bits of the associative memory 16 are all turned off, and the memory is invalidated. When the presence of data within the cache 11 is to be checked, the associative memory 16 reads out a group of data and a valid bit of an entry storing an address that coincides with the address signal 116 on the internal signal lines 160 and 121, respectively. When there is no address that coincides, the signal 121 is turned off. When a write enable signal 118 is on, the associative memory 16 performs a write operation. If the new entry write signal 120 is off, the data signal 115 is written into a data field of an entry having an address stored that coincides with the address signal 116, and the valid bit of this entry is turned on. When the new entry signal 120 is on, the output of the AND gate 18 which responds to the write enable signal 118 and the new entry write signal 120 is turned on, and the counter 17 is incremented by +1. That is, when an address signal, data and a valid bit are to be stored in the associative memory 16, the counter 17 changes sequentially the entry that should be used for writing of that data. The switch 19 is a bidirectional one which connects the data signal line 160 and the data signal line 115 together when the switch control signal 119 is on, and which connects the data signal line 122 and the data signal line 115 together when the switch control signal 119 is off.

Figure 7:
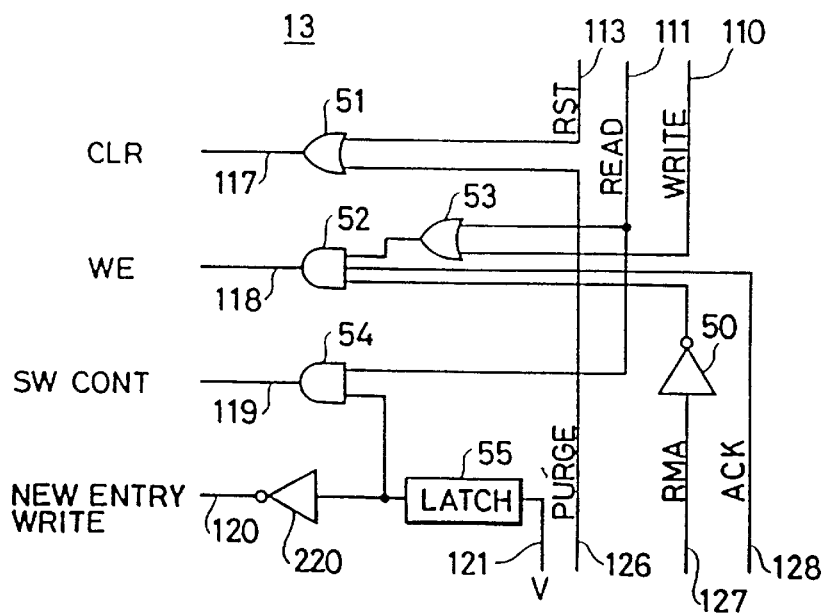
FIG. 7 is a diagram of a cache memory control circuit of FIG. 5.

FIG. 7 is a diagram of the cache control circuit 13 which consists of OR gates 51, 53, AND gates 52, 54, inverters 50, 220 and a latch circuit 55. The AND gates 52, the OR gate 53 and the inverter 50 produce the write enable signal 118 in response to the read request signal 111 or the write request signal 110, and in response to the ACK signal 128 and an inverted signal of the RMA signal. 127, to instruct the cache 11 to perform a write operation. It is to be noted that the write enable signal 118 is not generated when the RMA signal 127 is on.

The OR gate 51 responds to the reset signal 113 or the purge signal 126 and generates the clear signal 117, to invalidate the cache 11. The AND gate 54 responds to the read request signal 11 and a delayed signal of the valid bit signal 121 delayed by the latch circuit 55, which delays the valid bit signal 121 until data read out of the main memory 2 arrives at the cache 11. The new entry write signal 120 is provided by the inverters which respond to the delayed signal of the valid bit signal 121, to indicate to the cache 11 to write a new entry of data, an address and a valid bit signal therein.

Figure 8:
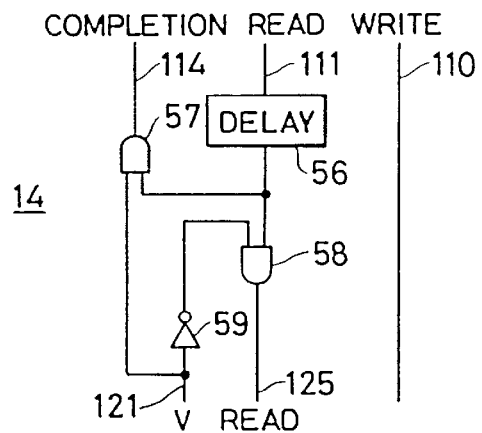
FIG. 8 is a diagram of a read/write control circuit of FIG. 5.

FIG. 8 is a diagram of the read/write control circuit 14 which consists of a delay circuit 56, AND gates 57, 58 and an inverter 59. The write request signal 110 is passed through the read/write control circuit 14 to provide the write request signal 110 to the bus 100 (FIG. 5).

The AND gate 58 generates the read request signal 125 in response to the read request signal 111 delayed by the delay circuit 56 and an inverted form of the valid bit signal 121 inverted by the inverter 59. The AND gate 57 provides the completion signal 114 in response to the valid bit signal 121 and the delayed signal of the read request signal 111. The delay circuit 56 is provided so that reference is not made to the valid bit signal 121 by the AND gates 57, 58 until the valid bit signal 121 is determined as a result of the address check by the cache 11.

Figure 9:
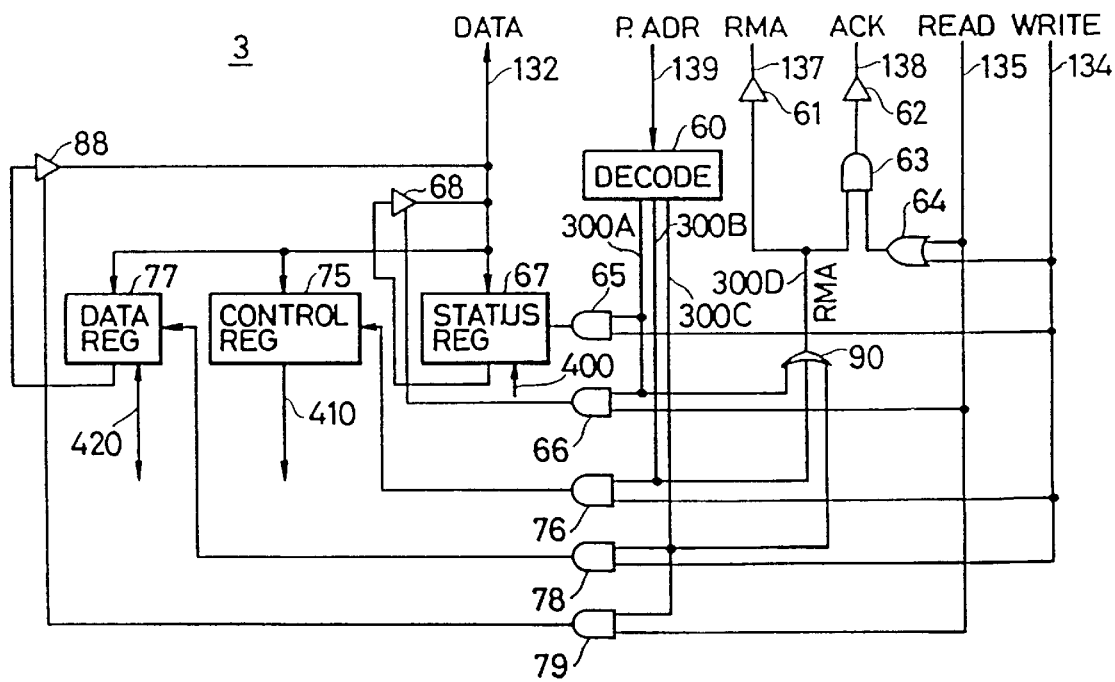
FIG. 9 is a diagram of an input/output control circuit of FIG. 5.

FIG. 9 is a diagram of the input/output control circuit 3 which consists of a decoder 60, AND gates 63, 65, 66, 76, 78, 79, OR gates 64, 90, a tristate buffer 68, 88, open emitter buffers 61, 62 a status register 67, the control register 75 and the data register 77. The status register 67 receives status data from the input/output device by way of the line 400.

The control register 75 sends its content to the input/output device 4 by way of the line 410 to control it.

The data register 77 receives data from the MPU 1 by way of the line 132 and sends it to the input/output device 4 by way of the line 420, or vice versa.

The decoder 60 decodes the address signal 139, discriminates whether the input/output control circuit 3 is selected or not, and further discriminates which register is selected. When the addresss 139 is equal to $a_4$, $a_5$ or $a_6$, as shown in FIG. 13, it means that the status register 67, the control register 75 or the data register 77 is a selected register. When the decoder 60 detects that the address 139 is equal to $A_4$, it turns on the line 300A.

When the data is to be written into the status register 67, that is, when the write request is provided on the line 134, the output of the AND gate 65 is turned on to write the data on the line 132. When the data is to be read from the status register 67, that is, when the read request is provided on the line 135, the output of the AND gate 66 is turned on, and the tristate buffer 68 is turned on, thereby to transfer the data of the status register 67 to the data signal line 132. The OR gate 90 sends the RMA signal on the line 300D in response to the signal on the line 300A, thereby to transmit the RMA signal onto the line 137 by way of an open emitter buffer 61. The AND gate 63 receives the outputs of the OR gate 64 which receives either the read request signal 135 or the write request signal 134. Thus, the ACK signal is generated by the gates 63 and 64 in response to the RMA signal on the line 300D and the read request signal 135, thereby to allow the open emitter buffer 62 to drive the ACK signal on the line 138.

When the address on the line 139 is equal to $a_5$, the decoder 60 turns on the lines 300B. The AND gate 76 is enabled by the signal on the line 300B, when the write request is provided on the line 134. When the AND gate 76 is enabled, the control register 75 receives the data on the line 132 in response to the output of the AND gate 76. The RMA signal 137 and the ACK signal 138 are generated in response to the signal on the line 300B and the write request on the line 134, as in the case of the selection of the status register 76. When the address 139 is equal to $a_6$, the decoder 60 enables the line 300C, thereby to enable the AND gates 78 or 79, respectively, when the write request signal 134 or the read request signal 135 is provided. The tristate buffer 88 is enabled in response to an enabled output of the AND gate 79 when the read request signal 135 is provided to the AND gate 79, thereby to allow read-out of the data of the data register 77 onto the line 132. The enabled output of the AND gate 78 enables the data register 77 to store data on the line 132, when the write request signal 134 is provided to the AND gate 78. The generation of the ACK signal 138 and the RMA signal 137 is effected in response to an output of the OR gate 90 which is enabled when the line 300C is enabled.

Figure 10:
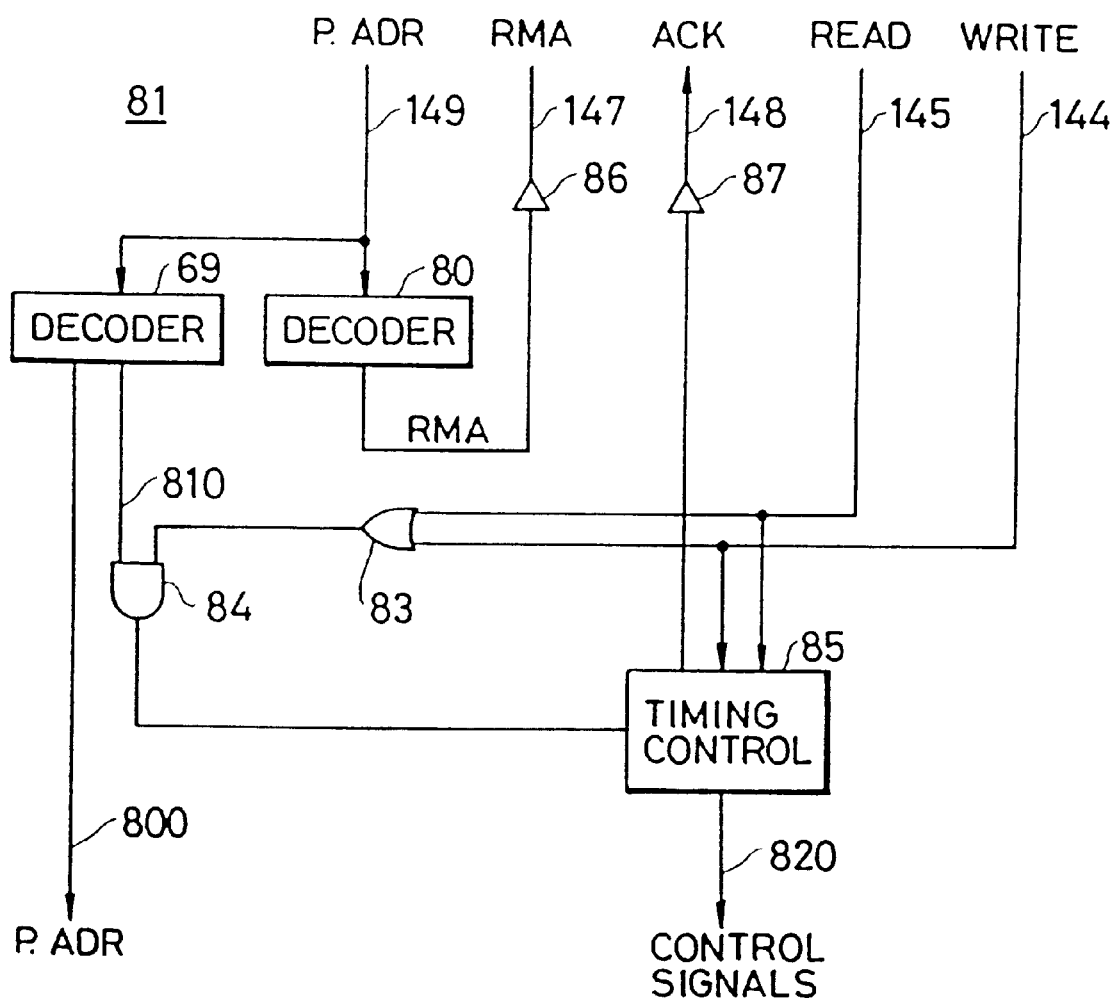
FIG. 10 is a diagram of a common memory control circuit shown in FIG. 5.

FIG. 10 is a diagram of the common memory control circuit 81 which consists of decoder 69, 80, open-emitter buffers 86, 87, an OR gate 83, an AND gate 84, and a timing control circuit 85. The decoder 69 detects whether the common memory 8 is selected or not, that is, whether or not the address on the line 149 belongs to $a_1$ to $a_3$-1, and turns on the line 810 and sends the address on the line 149 to the common memory unit 82 by way of the line 800, both when the detection result by the decoder 69 is affirmative. The decoder 80 detects whether the location which is to be accessed by the address on the line 149 is in a region of addresses $a_2$ to $a_3$-1, for communicating messages. When this particular region is selected, the decoder 80 sends the RMA signal. The open-emitter buffers 86 drive the RMA signal onto the line 147. The output of the OR gate 83 is turned on only when there is a read request signal 145 or a write request signal 144. The AND gate 84 responds to the signal on the line 810 and the output of the OR gate 83, thereby to activate the timing control circuit 85 only when there is an access to the common memory 8.

The timing control circuit 85 responds to the write request signal 144 and the read request signal 145 when an enabled output of the AND gate 84 is provided thereto, and produces control signals on the line 820 which is necessary for accessing the common memory unit 82, and further produces the ACK signal when the operation is completed. The ACK signal is applied onto the line 148 by the open-emitter buffer 87.

Figure 11:
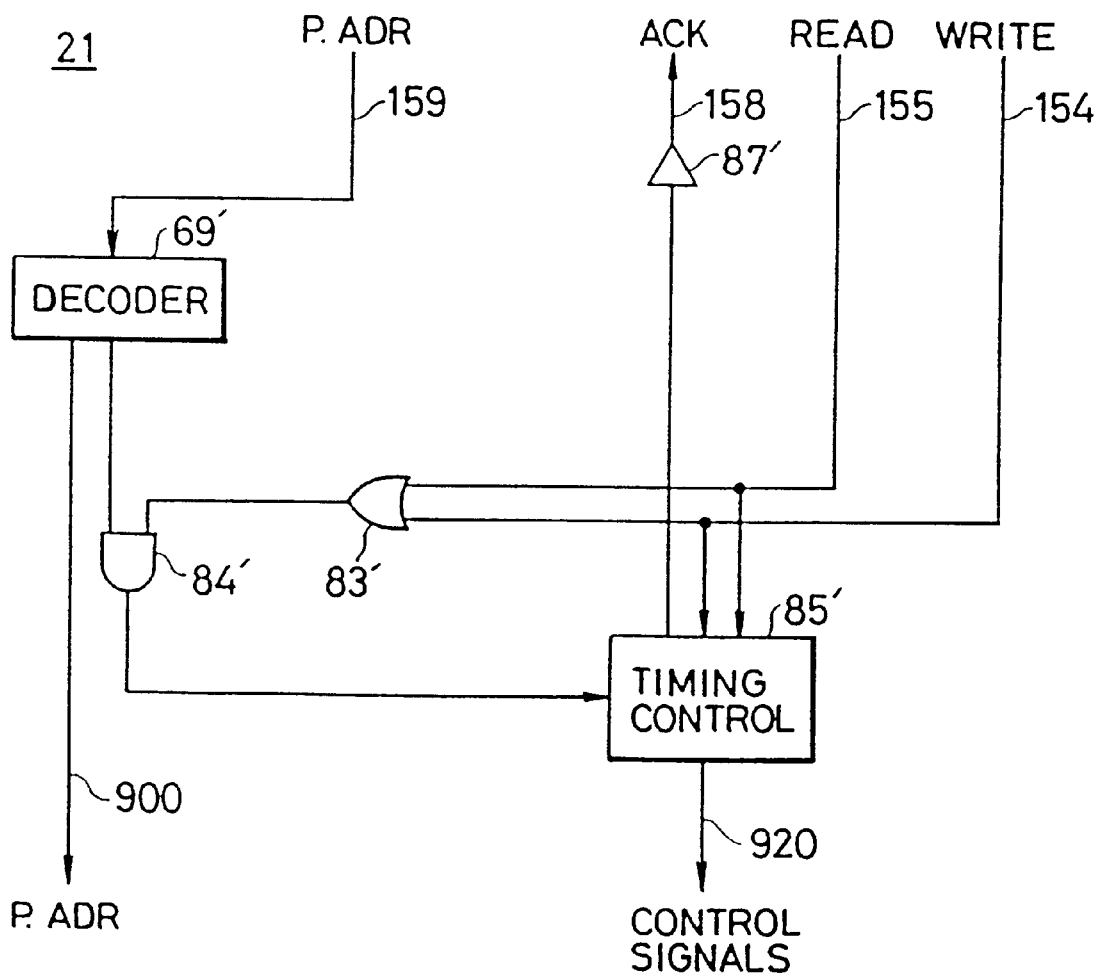
FIG. 11 is a diagram of a main memory control circuit shown in FIG. 5.

FIG. 11 shows a diagram of the main memory control circuit 21, wherein the reference numeral with a prime indicates the same circuit or the same circuit element as one with the same reference numeral in FIG. 10. It is clear that the main memory control circuit 21 differs from the common memory control circuit 81 in that the decoder 80 in FIG. 10 which generates the RMA signal is not provided in the main memory control circuit 21.

Figure 12:
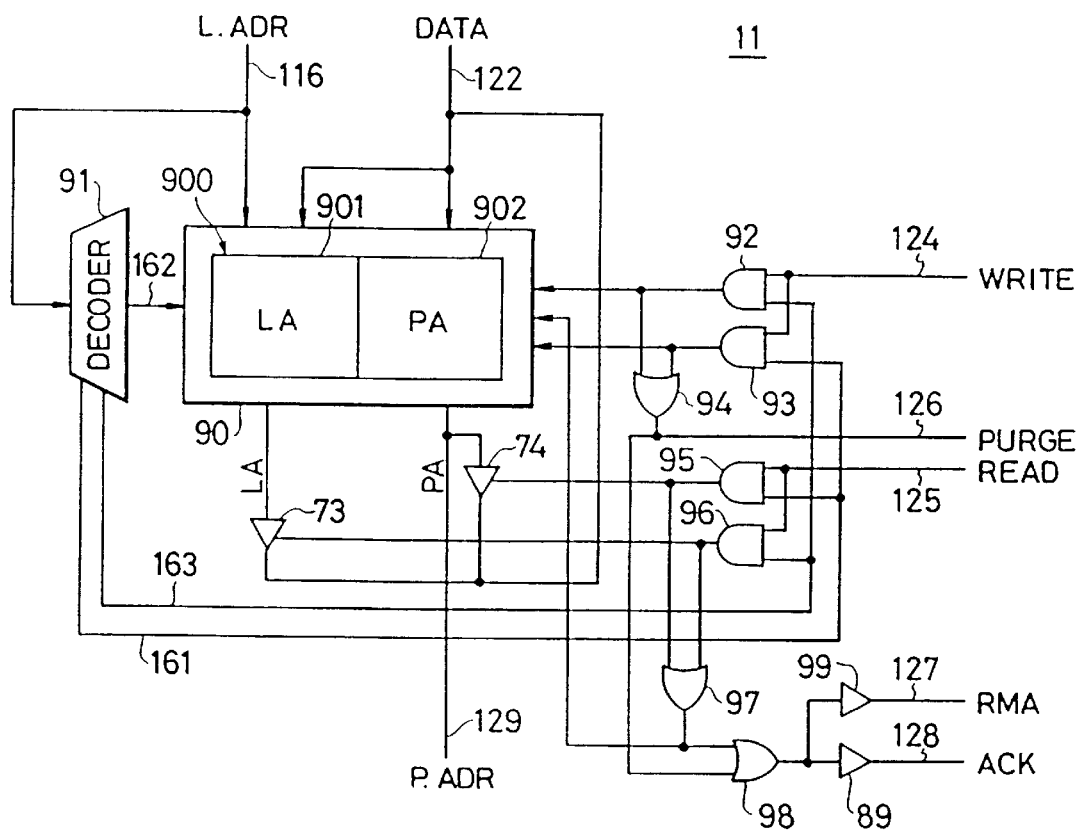
FIG. 12 is a diagram of a memory management unit of FIG. 5.

FIG. 12 is a diagram of the MMU 9, wherein the address translation table 90 responds to the logical address 116 to generate the physical address 129 by means of the logical address table 901 and the physical address table 902. The decoder 91 responds to the logical address 116 and turns on the line 163 or 161, respectively, depending upon whether the address 116 belongs to a region of addresses $a_7$ to $a_8$-1 or a region of addresses $a_8$ to $a_9$-1. The decoder 91 further provides a row selection signal 162 when either one of the two tables 901, 902 is to be accessed by the address 116.

In case of a write request to the logical address table 901, the AND gate 92 is enabled, because the write request signal 124 and the logical address table selection signal 163 are provided to the AND gate 92. Therefore, the data 122 is written onto a row of the logical address table 901 designated by the signal 162. Similarly, in case of a write request to the physical address table 902, the AND gate 93 is turned on, and the data 122 is written into the physical address table 902. When either one of the AND gates 92, 93 is turned on, the OR gate 94 generates the purge signal on the line 126. Furthermore, the output of the OR gate 94 is transferred to the respective lines 128, 127 as the ACK signal and the RMA signal, respectively, by way of the OR gate 98 and the open-emitter buffer 89 and by way of the OR gate 98 and the open-emitter buffer 99.

In case of a read request to the logical address table 901, the logical address and the physical address in a row accessed by the row signal 162 respectively within the logical address table 901 and the physical address table 902 are read out onto the tristate buffers 73 and 74, respectively. When the address 116 is for the logical address table 901, the AND gate 96 is turned on, and the read out logical address is transferred to the data signal line 122 by way of the enabled tristate buffer 73. Similarly, in case of the read request to the physical address table 902, the AND gate 95 is turned on, and the read-out physical address is read out onto the data signal line 122. When the AND gate 95 or 96 is turned on, the outputs of these two AND gates provide the ACK signal and the RMA signal, on the lines 127 and 128, respectively, by way of the OR gates 97, 98 and the open-emitter buffer 89, and by way of the OR gates 97, 98 and the open-emitter buffer 99.

According to the present invention, as will be obvious from the foregoing description, when the processor accesses memory which includes a particular region in which the stored content undergoes a change depending upon particular factors, such as in the memory mapped I/O system and in the multiprocessor system, the data at the time of accessing the particular region is inhibited from being held in the cache memory, so that inconsistency will not develop in the accessed data.

Therefore, it is possible to improve the performance of the system using a cache memory, while maintaining the advantages of the memory mapped I/O system that precisely controls input/output devices in response to general instructions as well as advantages of the multiprocessor system which is effective to disperse the load.

According to the disclosed embodiment, the microprocessor 1 includes the cache 11 and the cache control circuit 13. Further, the cache control circuit 13 in the microprocessor 1 receives the RMA signal that inhibits the data from being written into the cache 11. Therefore, the cache memory can be constituted independently of the microprocessor 1 provided the data that represents a particular region is not written therein. Accordingly, it is possible to provide a microprocessor which can be used for general purposes.

The prior art common memory control circuit or I/O control does not have a circuit portion which generates the RMA signal as shown by lines 137 and 147. This means that the prior art common memory control circuit and so on cannot be combined with the microprocessor 1 shown in FIG. 5 without modification.

Figure 14:
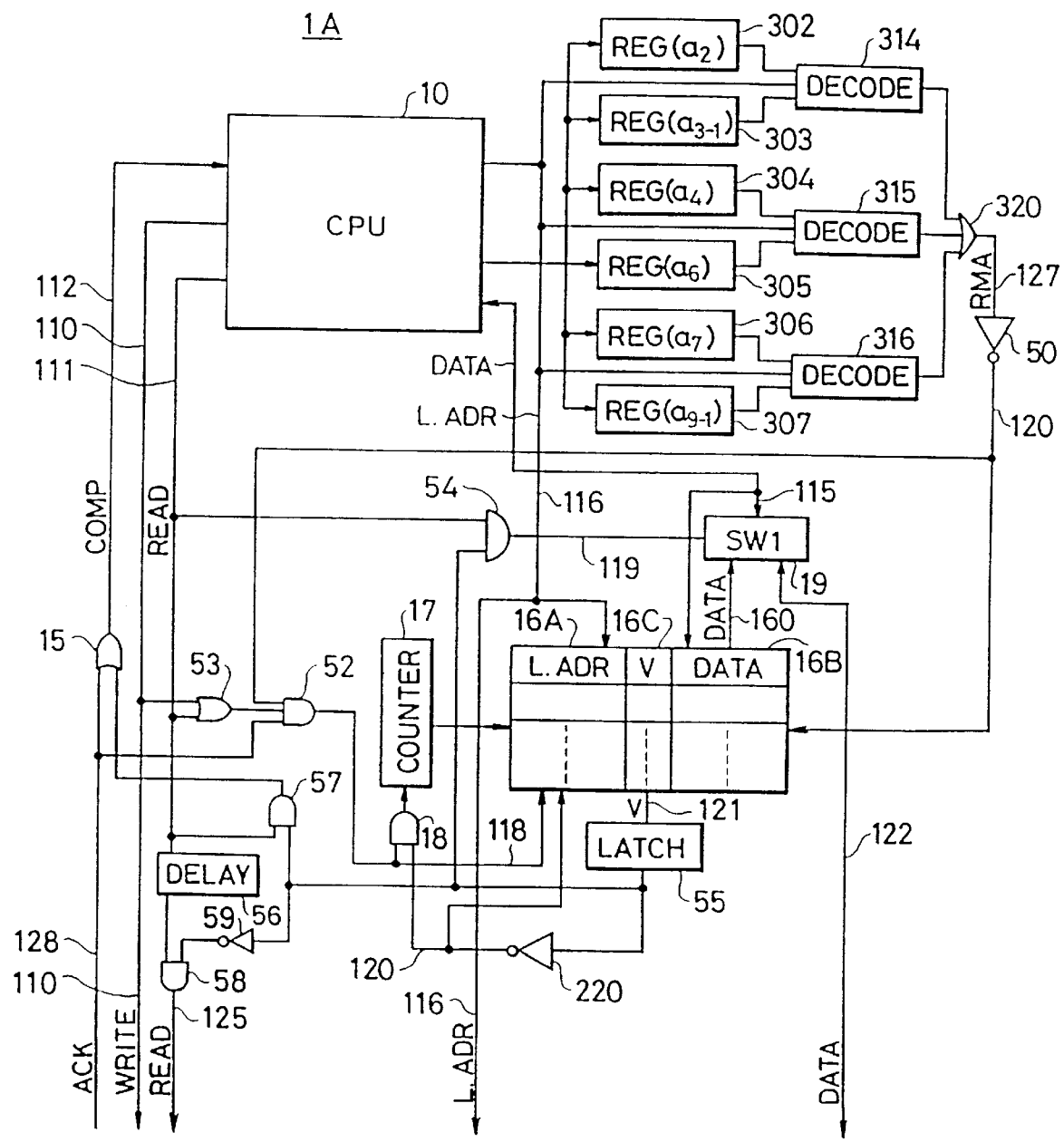
FIG. 14 is a diagram showing another system according to another embodiment of the present system.

FIG. 14 shows another embodiment of a data processing system according to the present invention wherein the prior art common memory control circuit and so on can be connected to the microprocessing unit 1A according to the present invention. FIG. 14 shows an internal structure of only the microprocessing unit 1A. The microprocessing unit 1A is connected to the main memory 2, common memory 8 and the I/O control 3 with slight modifications of the latter two circuits.

The same reference numerals in FIG. 14 as those in FIGS. 5–8 designates the same circuit elements. The microprocessing unit 1A in FIG. 14 differs from the microprocessing unit 1 in FIG. 5 only in that the microprocessing unit 1A has a circuit portion to generate the RMA signal used in the embodiment of FIG. 5. In FIG. 14, the circuit portion relating to clearing of the cache memory 11 or to purging of the cache is not shown for sake of simplicity. The registers 302 to 307, decoders 314 to 316, and OR gate 320 produce the RMA signal on the line 127, as will be explained later on in more detail. Therefore, the microprocessing unit 1A does not need to receive the RMA signal from outside. Therefore, the main memory control circuit, the common memory control circuit and the I/O control (all not shown in FIG. 14) which are to be connected to the microprocessing unit 1A can be those which do not have any circuit portions to generate the RMA signal.

At the initial stage of operation of the system, CPU 10 sets the lower limit address $a_2$ and the upper limit address $a_3$-1 of the message communication region of the logical address region shown in FIG. 13 into the registers 302 and 303, respectively. Similarly, CPU sets the addresses $a_4$ and $a_6$ shown in FIG. 13 into the registers 304 and 305. CPU further sets the addresses $a_7$ and $a_9$-1 into the registers 306 and 307.

FIG. 13 should be regarded as depicting a memory map for logical addresses regarding the embodiment of FIG. 14.

When CPU issues a read request signal 111 or write request signal 110, it issues the logical address associated with the issued request signal onto the line 116. The decoder 314 generates the RMA signal when the issued logical address on the line 116 falls within the address region from $a_2$ to $a_3$-1 shown by the registers 304, 305. The decoder 315 generates the RMA signal when the issued logical address on the line 116 falls within the address region from $a_4$ to $a_6$ shown by the registers 306, 307. The decoder 316 generates the RMA signal when the issued logical address on the line 116 falls within an address region from $a_7$ to $a_9$-1 shown by the registers 306, 307.

The RMA signal provided from any of the decoders 314 to 316 is transferred to the inverter 50 by way of an OR gate 320. When the RMA signal exists on the line 127, the data is not written, quite in the same way as explained in connection with the embodiment of FIG. 5.

As the operation of the microprocessing unit 1A is the same as that of the microprocessing unit 1 of FIG. 5, no further detailed explanation of the operation of the former will be given for sake of simplicity.

According to the embodiment shown in FIG. 14, CPU 10 can set the addresses in the registers 302 to 307 by executing program instructions. Therefore, this embodiment can be applied to any system which has arbitrary address regions, the data for which should not be written in the cache memory, and the prior art common memory control circuit or I/O control which has no circuit portion to generate the RMA signal. As no signal line is required for the microprocessing unit 1A to receive the RMA signal from outside, this reduces the number of pins required for the microprocessing unit 1A to exchange signals with outside.

The number of external circuits which can be connected to the microprocessing unit 1A is, however, limited by the number of the registers 302 to 307 and the decoders 314 to 316, which does not occur in case of the embodiment of FIG. 5.

What is claimed is:

1. A data processing system in which at least two memory address regions are assigned, said data processing system comprising:

a main memory for storing data, said main memory being assigned a first memory address region of said memory address regions;

an output control circuit including a memory unit for storing data, said memory unit being assigned a second memory address region of said memory address regions; and a microprocessor, said microprocessor comprises:

a processing circuit which executes an instruction and generates an address, a cache memory, coupled to said processing circuit, for storing data, and a logical circuit, coupled to said cache memory, for controlling writing of data in said cache memory in accordance with said address corresponding to said first memory address region and not writing of data in said cache memory in accordance with said address corresponding to said second memory address region, wherein said logical circuit includes a plurality of registers which store address values indicating said second memory address region, said address values being used in said logical circuit to control whether data is written in said cache memory or not.

2. A data processing system according to claim 1, further comprising:

an output device coupled to said output control circuit for outputting data.

3. A data processing system comprising:

a memory device for storing data, wherein a first memory address region of a plurality of memory address regions is assigned to said memory device;

an output control unit including a memory unit for storing data, wherein a second memory address region of said plurality of memory address regions is assigned to said memory unit; and a processor, said processor comprises:

a processing unit for executing an instruction and generating an address, a cache memory coupled to said processing unit for storing data, and a control unit, coupled to said cache memory, for executing a data write operation of said cache memory when said address corresponds to said first memory address region, and not executing the data write operation when said address corresponds to said second memory address region, wherein said control unit includes a register which is settable to an address value which indicates said second memory address region.

4. A data processing system according to claim 3, further comprising:

an output device coupled to said output control unit for outputting data.

5. A data processing system according to claim 4, wherein said address value is set in said register at an initial stage of operation of the data processing system.

6. a processing system comprising:

a main memory for storing data, said main memory being assigned a first memory address region;

an output control unit including a memory unit for storing data, said memory unit being assigned a second memory address region; and a microprocessor, said microprocessor comprises:

a processing unit for executing an instruction and generating an address, and a cache memory unit for writing data when it is detected that said address relates to said first memory address region and not writing data when it is detected that said address relates to said second memory address region, wherein said cache memory unit includes a plurality of registers which are used to store values for detecting whether said address relates to said second memory address region or not.

7. A processing system according to claim 6, further comprising:

an output device, coupled to said output control unit, for outputting data.

8. A processing system according to claim 7, wherein said values are stored in said registers at an initial stage of operation of the processing system.

9. A data processing system in which a plurality of address regions are assigned, said data processing system comprising:

a main memory for storing data, said main memory being accessed in accordance with an address belonging to a first address region of said plurality of address regions;

an input/output control device including a memory unit for storing data, said memory unit being accessed in accordance with an address belonging to a second region of said plurality of address regions; and a microprocessor, said microprocessor comprises:

a processing unit for executing an instruction and generating an address, and a cache memory unit, coupled to said processing unit, for writing data when said address generated by said processing unit relates to said first address region and not writing data when said address generated by said processing unit relates to said second address region, wherein said cache memory unit includes a plurality of registers which store a range values of said second address region, said range values stored in said registers are used for controlling not to write data in said cache memory unit.

10. A data processing system according to claim 9, further comprising:

an input/output device, coupled to said input/output control device, for inputting/outputting data.

11. A data processing system in which at least two memory address regions are assigned, said data processing system comprising:

a main memory for storing data, said main memory being assigned a first memory address region of said at least two memory address regions;

an output control circuit including a memory unit for storing data, said memory unit being assigned a second memory address region of said at least two memory address regions;

a processing circuit which executes an instruction and generates an address;

a cache memory, coupled to said processing circuit, for storing data; and a logical circuit, coupled to said cache memory, for controlling writing of data in said cache memory in accordance with said address corresponding to said first memory address region and not writing of data in said cache memory in accordance with said address corresponding to said second memory address region, wherein said logical circuit includes a plurality of registers which store values indicating said second memory address region, said values being used to control whether data is written in said cache memory or not.

12. A data processing system according to claim 11, further, comprising:

an output device, coupled to said output control circuit, for outputting data.

13. A data processing system comprising:

a memory device for storing data, wherein a first memory address region of a plurality of memory address regions is assigned to said memory device;

an output control device including a memory unit for storing data, wherein a second memory address region of said plurality of memory address regions are assigned to said memory unit;

a processing unit for executing an instruction and generating an address;

a cache memory for storing data; and a control unit, coupled to said cache memory, for executing a data write operation of said cache memory when said address relates to said first memory address region and not executing the data write operation when said address relates to said second memory address region, wherein said control unit has a register which is settable to an address value which indicates said second memory address region.

14. A data processing system according to claim 13, further comprising:

an output device, coupled to said output control device, for outputting data.

15. A data processing system according to claim 14, wherein said address value is set in said register at the initial stage of operation of the data processing system.

16. A data processing system comprising:

a main memory for storing data, said main memory being accessed with an address belonging to a first memory address region;

an output control device including a memory unit for storing data, said memory unit being accessed with an address belonging to a second memory address region;

a processing unit for executing instructions and generating addresses;

a cache memory, coupled to said processing unit, for storing data; and a control unit, coupled to said cache memory, for executing a data write operation of said cache memory when one of said address corresponds to said first memory address region, and not executing said data write operation when another of said addresses corresponds to said second memory address region, wherein said control unit having a plurality of registers which store address values for detecting that said another of said addresses corresponds to said second memory address region.

17. A data processing system according to claim 16, further comprising:

an output device, coupled to said output control unit, for outputting data.

18. A data processing system according to claim 17, wherein said address values are stored in said registers at an initial stage of operation of the data processing system.

* * * * *